United States Patent [19]

Dorfman et al.

[11] 4,139,735

[45] Feb. 13, 1979

[54] CARRIER CURRENT COMMUNICATIONS SYSTEM

[76] Inventors: Bertrand Dorfman, 444 E. 82 St., New York, N.Y. 10028; Victor Zadikow, 609 Larkfield Rd., East Northport, N.Y. 11731

[21] Appl. No.: 757,736

[22] Filed: Jan. 7, 1977

[51] Int. Cl.² .................. H04M 11/00; H04H 1/08
[52] U.S. Cl. ........................ 179/2.5 R; 340/310 R
[58] Field of Search ............. 179/2.5 R, 2.5 A, 2.5 B; 340/310 R, 310 A

[56] References Cited

U.S. PATENT DOCUMENTS

| 1,945,629 | 2/1934 | Duncan, Jr. ................. | 179/2.5 B |
| 2,023,857 | 12/1935 | Satterlee et al. ............ | 179/2.5 R |
| 2,179,612 | 11/1939 | Butler ........................ | 179/2.5 B |
| 2,389,257 | 11/1945 | Halstead .................... | 179/2.5 B |
| 3,949,172 | 4/1976 | Brown et al. ................ | 179/2.5 R |
| 4,012,733 | 3/1977 | Whyte ........................ | 179/2.5 R |
| 4,020,289 | 4/1977 | Anderson .................... | 179/2.5 R |

Primary Examiner—Thomas A. Robinson

[57] ABSTRACT

A plurality of transmitters and receivers arranged for carrier current communications are generally placed throughout a large building. The transmitters and receivers are coupled to selected portions of the power distribution system. The selected portions are stairwell exit and lighting risers emanating from the same location of contiguous circuit breakers. Coupling circuits are applied to both remote transceivers and the central station transceivers. These circuits insure that remote station receivers always present high impedance to the power line at the carrier frequencies and that remote transmitters do not load the lines. At the central station, a bridge arrangement of the networks couples energy to and from the lines, with additional isolation between receiver and transmitter circuits. Mutual interference of transmitted and received signals are avoided by taking advantage of the impedance in the length of line from the central station to coupling and line conditioning circuits, and capacitor tuning to the center frequency of the transmitter line and to the center frequency of the receiver circuits. Low impedance at the common bus allows the signals to be readily transmitted to the risers.

12 Claims, 6 Drawing Figures

|  | f1 | f2 | f3 | f4 |
|---|---|---|---|---|
| RTC (REMOTE) | XMT | XMT | RCVR | RCVR XMT |
| CENTRAL STATION (FCS) | RCVR | RCVR | XMT | RCVR XMT |

CARRIER CURRENT COMMUNICATIONS SYSTEM

BACKGROUND OF THE INVENTION

This invention relates to the method of implementing a carrier current communications and control system in large multi-storied buildings.

Carrier current systems utilize existing power distribution systems (systems of wires, raceways, protective and disconnect devices, transformers, etc., installed for the purpose of distributing low frequency (50 to 400 Hertz) alternating current power in a building) to provide the electrical path for non-power related carrier transmissions modulated in some manner in order to transmit voice and/or data individually or in combination. These carrier signals are transmitted throughout the building via the existing power distribution system simultaneously with the transmission of low frequency power. In a carrier current system, transmitters generate modulated carriers which are coupled onto the existing power distribution system via an appropriate coupling network, and receivers receive and demodulate the carrier providing the desired transmission of voice and/or data signals.

At present in order for a carrier current system to effectively transmit and receive information, AC power line coupling devices must be located throughout the building at all transformers, distribution panels and phase separation and protection networks. Each AC power line must be considered a separate path in that at the operating frequencies considered practical for carrier current communications the effects of transformers, separate riser networks, etc., present such high impedance to the communications link that it must be considered an open circuit and therefore a separate line. To unify this plurality of individual links, AC power line coupling devices are used.

AC power line coupling devices are frequency selective networks. When a carrier current system is used to transmit information in a building, it is possible and often desirable to locate transmitters and/or receivers at every location which is either a source or destination of information. In applications where a relatively small number of such locations (either source or destination) are required, individual transmitters and receivers at each location are used. However, where a relatively large number of locations exist, a smaller number of transmitters and receivers is used and some form of multiplex arrangement (time, frequency or a combination thereof) is used to communicate with two or more devices via a single receiver or transmitter. This approach requires the use of a multiplexer with the transmitter and a companion demultiplexer with the receiver.

Moreover, the high attenuation, high and dynamic loading and noise levels normally experienced in the power distribution systems in a building degrade the reliability and performance when communicating over the power lines.

In this environment, the signals of adequate strength transmitted from the transmitting portion at a central station to be received by a large number of remote receivers are liable to be received back on receiving portions at the same central station. Also excessive line loading and low impedance can result from the great many loads of lights and other equipment connected to the distribution network.

SUMMARY OF THE INVENTION

Accordingly, an object of this invention is to provide a carrier current communications system with improved reliability and performance.

A related object of this invention is to provide a large signal in carrier current systems, within the limits of power supplies and FCC regulations.

Another object of the invention is to prevent mutual interference at a central transmitting and receiving station so that transmitted signals are not received back on a dedicated alarm channel receiver.

A related object of this invention is to take advantage of the electrical characteristics and lengths of the lines from the central station to provide optimum separation of transmitted and received signals in the carrier current system.

A further object of the invention is to provide optimum coupling of transmitter power and receivers at a central station and at remote stations to the power lines in a carrier current system.

An additional object of this invention is to provide a bridge arrangement to optimally couple energy to and from the carrier current lines, while providing additional isolation between receiver and transmitter circuits of a central station.

The objectives of this invention are accomplished by providing coupling circuits which are advantageously adapted to accomodate transmission and reception over the stairwell and exit lighting risers. At a central station, mutual interference of transmitted and received signals are avoided by taking advantage of the impedance in the length of line from the central station to coupling and line conditioning circuits, and capacitor tuning to the center frequency of the transmitter line and to the center frequency of the receiver circuits; taking advantage of the fact we have two lines, one for transmission and one for reception. The low impedance at the common bus allows the signals to be readily transmitted to the risers.

Coupling arrangements at many remote stations present high impedance to the line at carrier frequency.

BRIEF DESCRIPTION OF THE DRAWING

Accordingly, each of the above objects and features of this invention will be readily understood from the following description, taken together with the drawings in which.

DETAILED DESCRIPTION OF THE ILLUSTRATED EMBODIMENT

Referring to FIGS. 1 through 6, embodiments will be described which provide optimum coupling circuits for connecting receivers and transmitters to the power lines in a carrier current system, particularly adapted to the characteristics of the stairwell and exit lighting risers in large buildings.

This embodiment relates to successfully transmitting data signals and audio signals using pulse width modulated signals and amplitude modulated RF signals on the power lines.

This embodiment describes networks that are used to couple receivers, transmitters and transceivers to the power lines in such manner as to prevent mutual interference and excessive line loading (low impedance due to the great many loads of the lights and other equipment connected to the power lines in the building) and provide optimal signal transmission between a central station and the remote stations.

Figure 1:
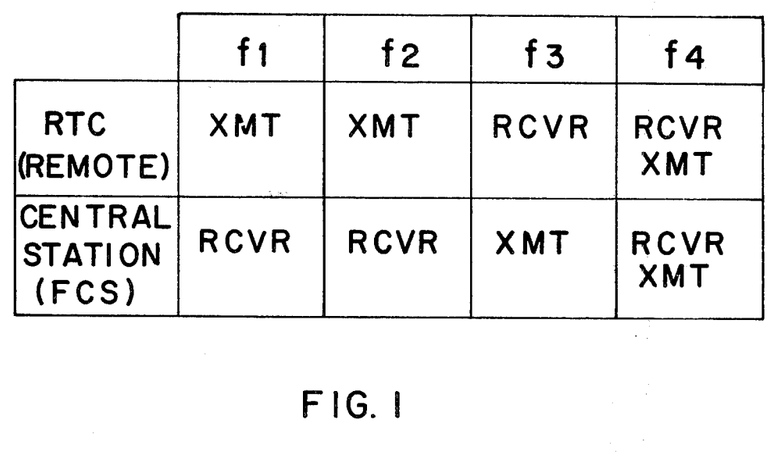
FIG. 1 is a Table which summarizes the RF equipment in remote locations in a building and those at a central station communicating with the remote locations.
Figure 2:
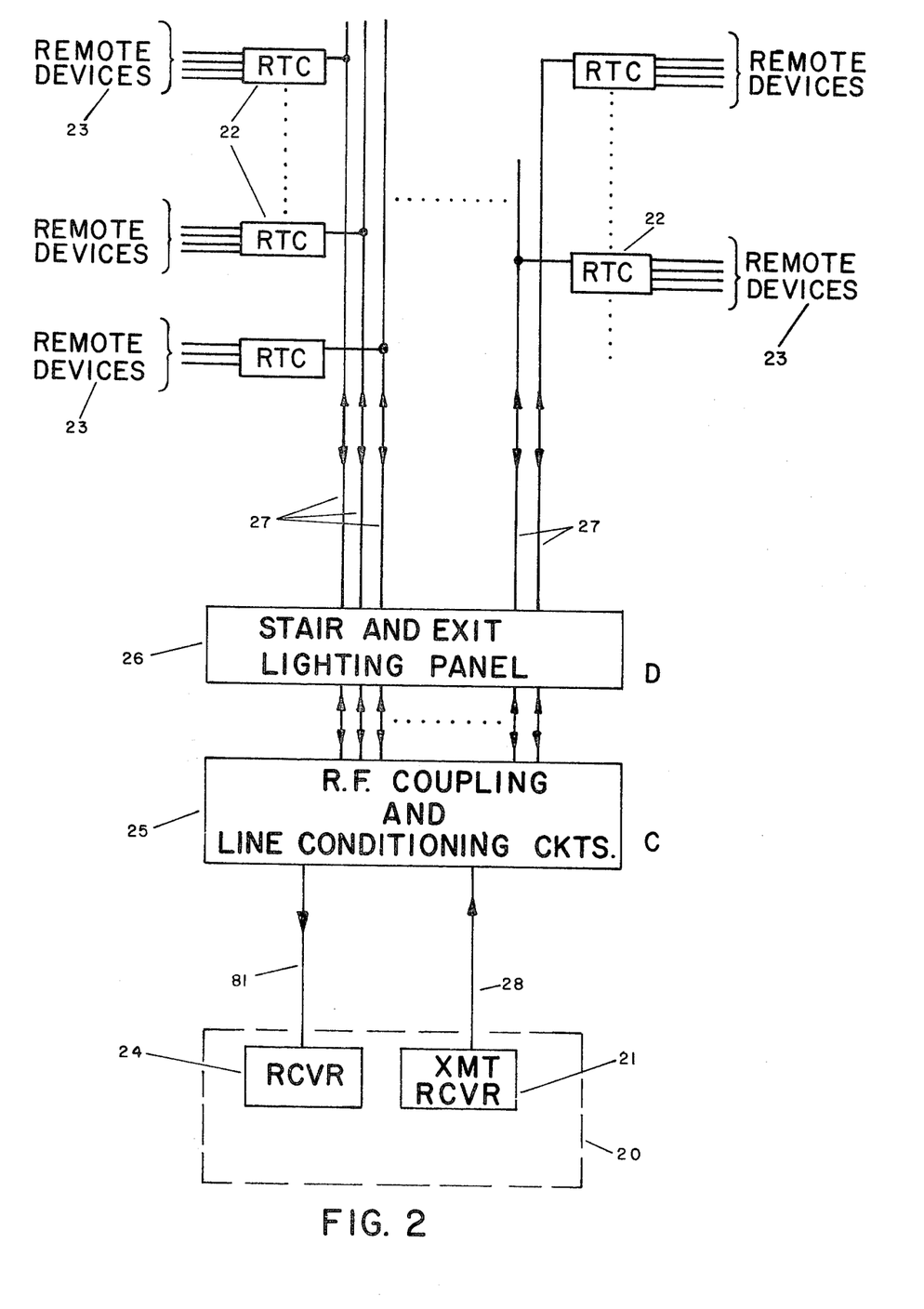
FIG. 2 is a simplified block diagram of an entire carrier current system, including the central station.

Referring to FIGS. 1 and 2, an entire carrier current communication system comprises a central station (20), such as a Fire Command and Central Station for Fire Control Systems, located at a lower level of a large building and Remote Transceivers RTC (22). These, in turn, communicate with a substantially larger number of Remote Devices (23) such as smoke detectors, loud speakers, intercom equipment and actuating devices, through multiplex arrangements (not shown). The central station (20) is connected to RF coupling and line conditioning circuits (25) by wire pairs (28, 81). The RF coupling and line conditioning circuits (25) are connected to a Stair and Exit Lighting Panel (26), from which stairwell and exit lighting risers (27) extend vertically through the building. At each floor, in the stairwell (not shown) the transceivers RTC (22) are connected to the risers (27).

Characteristically, there are four (4) modes of communication in a system, such as a fire control system for large buildings, that utilize these coupling networks. The four modes of operation are as follows: (1) Command-Response, (2) Asynchronous, (3) Intercom and (4) Public Address. There are four center RF frequencies utilized in the system, namely: F1, F2, F3 and F4 (See FIG. 7).

The Command-Response mode functions as follows: pulse width modulated RF signals are transmitted at radio frequency F3 from the transmitter (21) located at the central station (20) to a remote station RTC (22) located at remote locations in a large building. In the RTC (22), the incoming signal is decoded and used to control a remote device (23) connected to the RTC (22). In response to the commands, pulse width modulated signals are transmitted from the RTC (22) to the central station (20) at radio frequency F2.

In the Asynchronous mode, change of state of a remote device (23) is converted to pulse width modulated signals and transmitted from the RTC (22) to the central station (20) at radio frequency F1.

The Intercom mode between the RTC (22) and the central station (20), operates in the half-duplex manner with amplitude modulated signals at center frequency F4.

The Public Address mode operates only on transmission from central station (20) to the remote transceiver RTC (22) of audio amplitude modulated RF signals at center frequency F4.

FIG. 1 summarizes the RF equipment in the RTC (22) and in the central station (20); it also includes the operating frequencies. It is important to note that only three of the four RF center frequencies are on the power lines at one time; that is, F2 and F3 cannot exist on lines at same time.

Since various equipment operating at different frequencies are on the line, the manner in which the devices are coupled to the power lines (27) is of prime importance to provide reliable operation. As can be seen in FIG. 2, there is only one central station (20) and a multiplicity of RTC's (22). For the most part, only one RTC (22) transmits at any time, whereas the transmitter (21) of the central station (20) is on all the time. The central station (20) is usually at least 50 to 100 feet distant from the lighting panels (26), whereas the RTC transmitter (22) is in close proximity to coupling point on the power lines (27). In addition, the central station transmitter (21) must be capable of supplying RF signals of sufficient strength to a multiplicity of power lines (27) via RF coupling and line conditioning circuits (25), whereas any remote device RTC (22) need only be able to support a signal on a single line (27). As a result of the above described differences, the circuits and techniques used for coupling the RF equipment at the RTC (22) and at the central station (20) are quite different.

Figure 3:
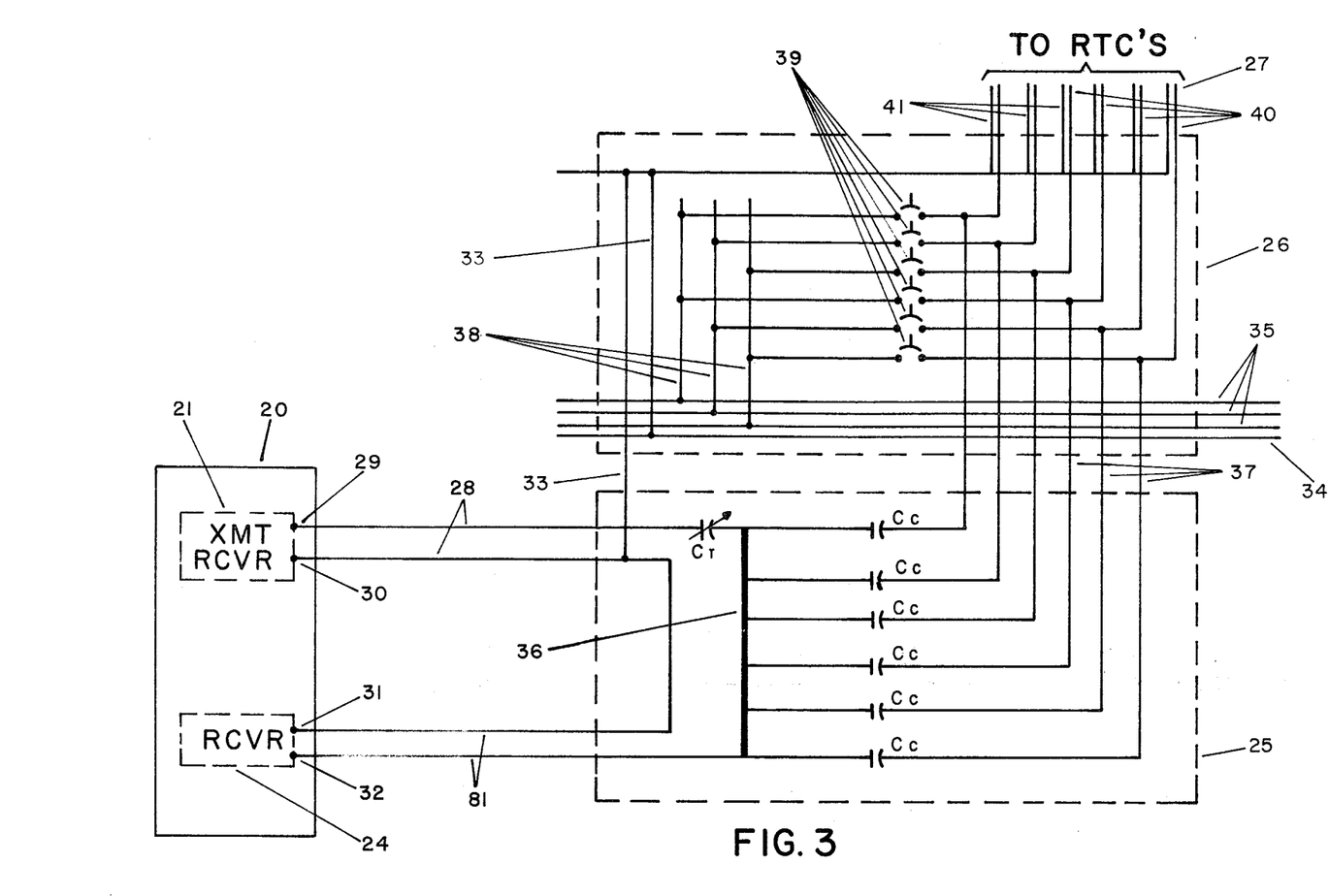
FIG. 3 is a circuit diagram in accordance with one embodiment of the invention especially advantageous for communicating over the stairwell and exit lighting risers.

FIG. 3 shows the detail of RF coupling and line conditioning circuits (25) and the manner of tying into the lighting risers (27) via the lighting panels (26). Two independent pairs of wires (28) couple signals from the receiver (24) and transceiver (21) at the central station (20) to the RF coupling and line conditioning circuits (25). One wire pair (28) emanates from terminals (29, 30) of the transceiver (21) and the second pair (81) emanates from terminals (31, 32) of the receiver (24). The wires from terminals (30, 31) are joined together in the coupling box (25) and these connect to wire (33) which connects to neutral wire (34) associated with the 3 phase incoming 60 hertz utility AC power source (35). Within the coupling box (25) the second wire (28) from the transceiver terminal (29) connects through variable capacitor $C_T$ to a common buses (36) and the second wire (81) from the receiver terminal (32) connects to the common buses (36).

Emanating from the common bus (36) a plurality of wires (37) connect through capacitors $C_c$ in the lighting panel (26) to the stairwell and exit lighting riser (27). In the lighting panel (26) wires (38) lead from the 3 phase power source (35) and connect through circuit breakers (39) to the leads (40) in riser (27). Leads (41) in riser (27) are connected to neutral wire (33).

Transceiver equipment (21) connected at terminals (29) and (30) operate at frequencies F3 and F4; receiver equipment connected at terminals (31) and (32) operate at frequencies F1 and F2. The central station (20) is at least 50 to 100 feet from the coupling box containing the RF coupling and line conditioning circuits (25), the coupling box (25) is within a few feet of lighting panel (26). The effect of the length of run from the central station to the coupling box (25) is a reactive impedance caused by the inductance of the line. This is indicated as $Z_A$ and $Z_B$ in FIG. 4. $Z_C$ represents the impedance presented by loading of the lighting panel (26) (normally low impedance at RF, high impedance at the power line frequency). This is real load of magnitude of approximately 0.5 to 2.0 ohms. $Z_L$ represents the inactive impedance of the lines (27) from the lighting panel (26) to RTC. The impedance value depends on distance from panel (26); typically 20–500 feet.

Figure 4:
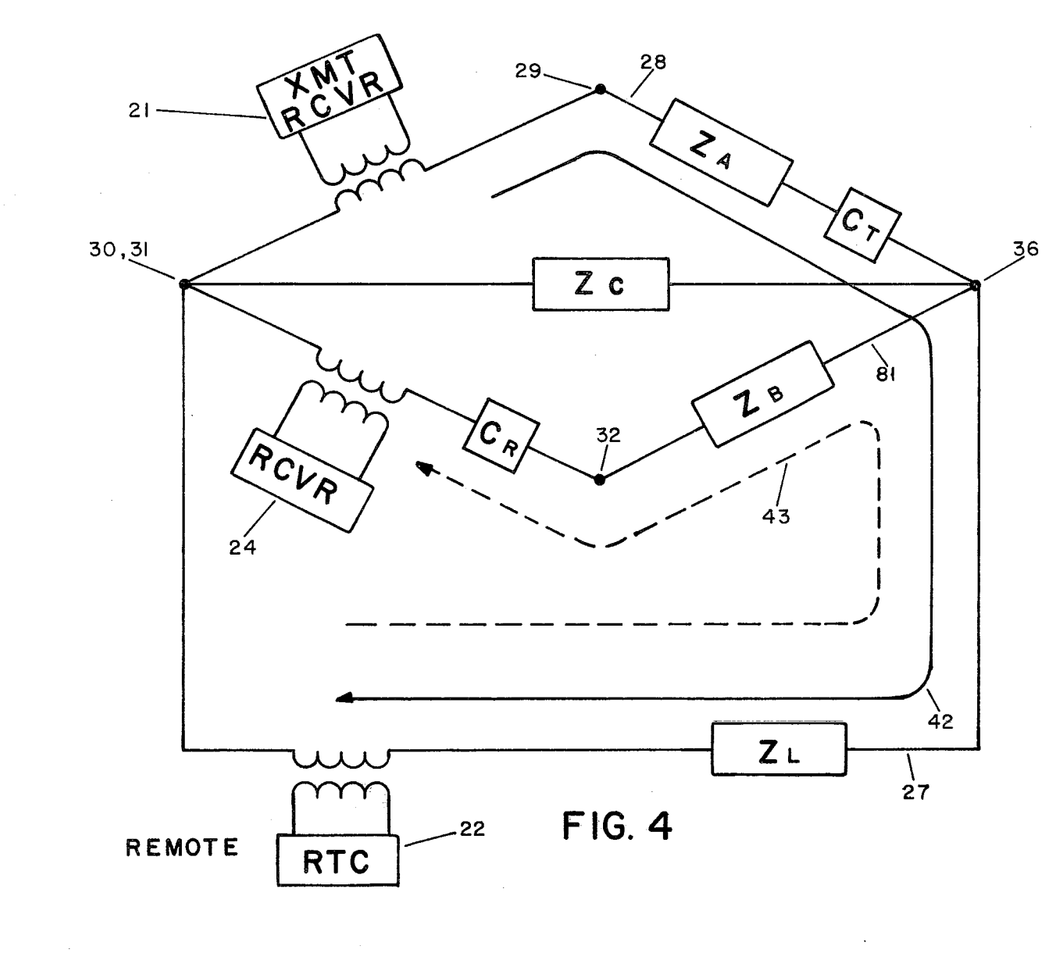
FIG. 4 is a schematic diagram showing the transmission paths and various impedances encountered in the embodiment according to FIG. 9.

FIG. 4 shows the desired transmission path (42) for signals transmitted from the transceiver (21) to the remote RTC (22) and the desired transmission path (43) from the RTC (22) to the receiver (24) at the central station. As shown, the transceiver (21), receiver (24) and RTC (22) are coupled to the line by transformers, to be more fully described.

Capacitor $C_T$ is used to tune out the impedance $Z_A$ presented by the line, to resonate at the frequency of the transmitter. Since the frequencies of interest on this pair of lines are F3 and F4, a compromise tuning procedure is chosen; that is, $C_T$ is tuned to resonate at the approximate center frequency $F_T = \sqrt{F3\ F4}$ (the geometric mean). In this manner, the optimum value of signal for F3 and F4 can be transferred from and to the central station (20) and lighting panel (26). The signals appearing on common bus (36) are coupled to the load via capacitors $C_C$ (low impedance at RF, high impedance at the power line frequency) on the lighting riser (27) side of the lighting panel (26). This insures that should the circuit breakers (39) be open, there is always a signal path for RF signals. In normal operation, the RTC's (22) obtain the primary power from the same lines as those used for signal transmission. In case of power failure, the RTC's (22) have provision for battery backup (not shown) to supply power. In this manner, the system is always on air.

Figure 5:
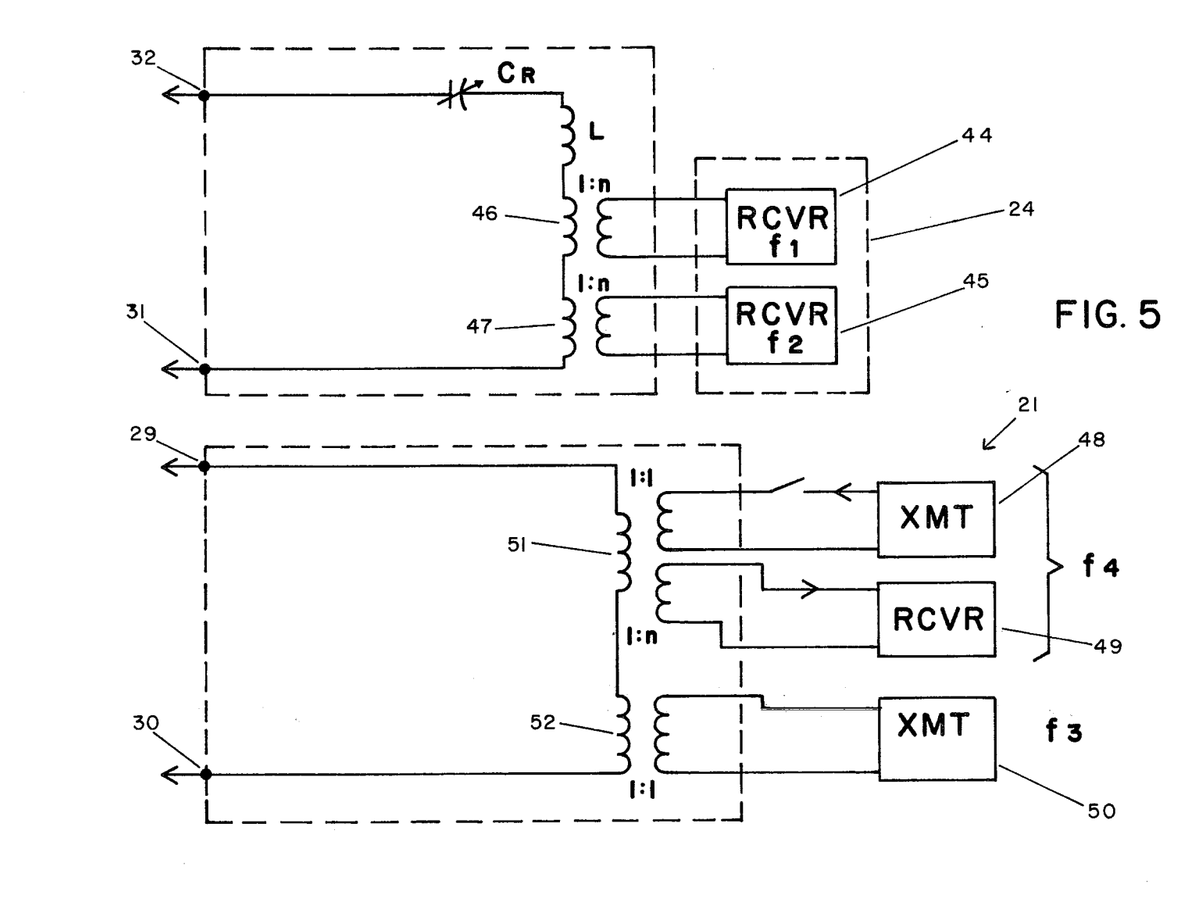
FIG. 5 shows the coupling circuits located at the central station in the embodiment according to FIG. 9.

The coupling networks located at the central station (20) are further described with reference to FIG. 5. The receiver (24) is comprised of two receiving channels (44, 45) operating at frequencies F1 and F2. Each channel (44, 45) is inductively coupled to the line by coupling transformers (46, 47). Inductor L and variable capacitor $C_R$ are connected in the line between the coupling transformers (46, 47) and input terminal (32). The transceiver (21) is comprised of transmitter (48) and receiver (49) (transceiver) at frequency F4 and transmitter (50) at frequency F3, inductively coupled to the line by coupling transformers (51, 52).

Capacitor $C_R$ is used to tune out the impedance $Z_B$ at frequency $F_R = \sqrt{F1\ F2}$ (the geometric mean of the frequency operating on the pair of lines). This insures optimum transfer of RF signals from the common signal buses (36) to the receiver (24) at the central station (20).

Transmitter (50) operating at frequency F3 can be on when receiver (44) operating at frequency F1 is receiving and transmitter (48) operating at frequency F4 can be on when both the frequency F1 and F2 receivers (44, 45) should be active. The separation between the optimum transmitter tuned frequency and receiver tuned frequency is large enough to allow for some wander of the transmitter and receiver frequency and still obtain adequate separation. Although there is sufficient selectivity of the receivers for most applications, this is greatly enhanced in this system by taking advantage of the following facts: (1) the impedance $Z_C$ (common bus) at $F_T = \sqrt{F3\ F4}$ is approximately one ohm, (2) the net impedance $(Z_B - X_{CR})$ is much greater than one ohm (at $F_T = \sqrt{F3\ F4}$ and (3) the reflected impedances of the Receiver $R_R$ is low and in the order of 1 ohm. As a result, the selectivity at $F_T$ is reduced by a factor of $\sqrt{(R_R)^2 + (Z_B - X_{CR})^2}$ (typically 10 to 20 db).

It should also be noted that even though the impedance of the receivers are low, due to the high impedance of $(Z_B - X_{CR})$ at $F_T$, the common bus (36) is not loaded down and most energy is directed to the remote (RTC's). In like manner, when signals on the bus (36) are at center frequencies F1 and F2, this impedance of transmitter and transceiver power lines $(Z_A - X_{CT})$ is much greater than the impedance of the bus and the receivers are not loaded down. At $F_R = \sqrt{F1\ F2}$, even though $C_R$ is tuned to cancel the impedance of line $Z_B$ and the reflected impedance of the receivers $R_R$ are low, the isolation of $X_L$ introduced by inductor L (See FIG. 5) prevents the receivers from loading the common buses at frequency $F_R$. The attenuation introduced by inductor L is compensated by the coupling transformer where the step up ratio is n:1 (n=36:1).

To summarize, the coupling network described utilizes the physical constraints imposed by the system, to optimally couple the RF signals to and from the equipment located in the central station (20)

Figure 6:
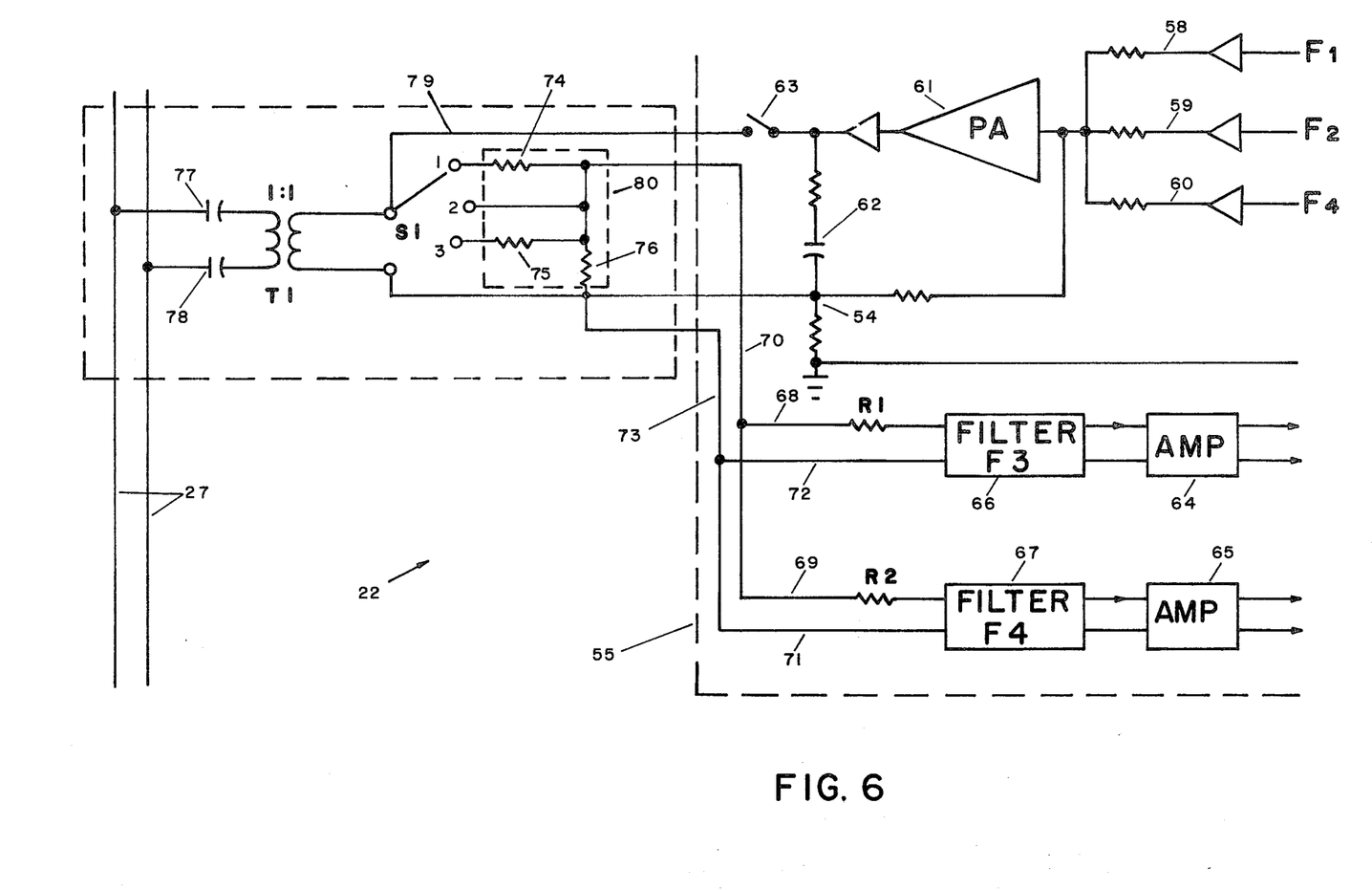
FIG. 6 shows an embodiment of the invention at the remote locations, especially advantageous for communicating with the embodiment according to FIG. 9.

FIG. 6 shows the coupling networks located at the remote RTC (22).

The requirements for coupling the remote devices (22) to the power lines (27) are different than for the central station (20). There are only two wire connections; that is, transmitter section (54) and receiver section (55) share one coupling network (56). In the case of RTC's (22), since receivers (55) are always on line and there is a multitude of them, it is necessary that they present a high impedance to the line at the operating frequencies, F3 and F4. In general, the magnitude of the impedance of the line is in the order of 20 ohms; therefore, the impedance of the receivers must be high. As a result, all receivers are coupled to power line via the coupling transformer (57) that has a 1:1 ratio (receivers have input impedances of approximately 5K ohms).

The transmitter section (54) is comprised of transmitters (58, 59, 60) operating at frequencies F1, F2, and F4, PA amplifier (61), feedback circuit (62) and switch (63) connected to the coupling transformers (57) over line (79).

The receiver section (55) is comprised of amplifiers (64, 65) fed through filters (66, 67) passing the receiving frequencies F3 and F4. Resistors $R_1$ and $R_2$ precede the filters and are connected through lines (68, 69, 70) through resistor (74) to terminal 1 of switch S1 of attenuator (80) to terminal 2 and to terminal 3 through resistor (75). Lines (71, 72, 73) connect the filters (66, 67) to the terminals through resistor (76).

When the transmitters are inactive (the duty cycle is low) they are taken off line via the switch (63). Any load presented to the transmitters (58, 59, 60) operating at frequenices F1, F2 and F4 present no problem since the P.A. amplifier (61) is capable of driving one ohm with sufficient signal to insure reliable communications of the system.

Capacitors (77, 78) connect the coupling transformer (57) to the stairwell exit and lighting riser lines (27) and are effective bypasses over the frequency range of interest. The coupling transformer (57) has a turn ratio of 1:1 and feeds two paths; one path (79) to the transmitter section (54) and the second path (70, 73) to the receiver section (55) via the attenuator (80). The attenuator (80) is used only to protect the input of the receivers from large signals (only the RTC's that are in close proximity to the central station). In most cases, the switch $S_1$ is in terminal position 2 which provides a direct path to the receivers. It should be noted that the coupling of the remote RTC's (22) does not require additional selectivity of receiver considerations since receiver frequencies F2 and F3 do not occur simultaneously and frequency F4 is far removed from frequency F1 and the receiver operating at frequency F4 operates either in the half-duplex manner or as a simple receiver.

The filters (66, 67) allow reception of signals at receiver frequencies F3 and F4, while presenting a high impedance to the line (27) at all frequencies.

In summary, the circuit arrangements provide as large a signal as possible in carrier current systems within the limits of power supplies and FCC regulations. At the central station (20) the circuit arrangements prevent mutual interference. Signals transmitted from transmitter (21) are not received back as dedicated alarm channel receiver (44) operating asynchronously at frequency F1. This is accomplished by taking advantage of the length of the line from the central station (20) to the coupling and line conditioning circuits (25) and tuning to the transmitter line (28) and to the receiver line (81). Also low impedance at the common bus (36) allows the signals to move up the stairwell and exit lighting riser line (27). Capacitor $C_T$ is tuned to resonate the line (28) for the transmitter and capacitor $C_R$ is tuned to resonate the line (81) for the receiver. Thus we take advantage of the fact that we have two lines (28, 81).

At the remote RTC's (22), we cannot impedance match the RTC's to the lines (27) (for greatest power transfer). Because we have so many pieces of equipment on line, we must have high impedance.

We claim:

1. A carrier current communications system for buildings having an AC power distribution system, comprising:
   (a) a central station having means for receiving signals over the AC power distribution system on a first radio frequency and means for transmitting signals over the AC power distribution system on a second radio frequency,
   (b) a plurality of remote stations having means for transmitting and receiving signals over the AC power distribution system on the first and second radio frequencies, respectively,
   (c) first wire means for coupling the receiving means at the central station to the AC power distribution system, having significant reactive impedance,
   (d) second wire means for coupling the transmitting means at the central station to the AC power distribution system, having significant reactive impedance,
   (e) first capacitive tuning means for substantially tuning out the impedance of the first wire means at the receiving radio frequency, and
   (f) second capacitive tuning means for substantially tuning out the impedance of the second wire means at the transmitting radio frequency.

2. A carrier current communications system according to claim 1 comprising capacitive coupling means having low impedance at radio frequencies for coupling the first and second wire means to the AC power distribution system.

3. A carrier current communication system according to claim 2 comprising common bus means for connecting the first and second wire means via the capacitive coupling means to stairwell exit and lighting risers of the AC power distribution system.

4. A carrier current system according to claim 1 in which
   (a) the remote stations transmit to the central station in an asynchronous mode on a third radio frequency,
   (b) the central stations and the remote stations communicate in a command the response mode on the first and second radio frequencies.

5. A carrier current system according to claim 2 comprising inductance means connected between the receiving means at the central station and the capacitive coupling means.

6. A carrier current system according to claim 1 comprising circuit breaking means connecting AC power to stairwell and exit lighting risers of the AC power distribution system,
   (a) the capacitive coupling means connecting to the stairwell and exit riser side of the circuit breaking means.

7. A carrier current system according to claim 1 in which the remote stations comprise means for presenting high impedance to the AC power distribution system at the second radio frequency.

8. A carrier current system according to claim 7 comprising receiving means having high input impedance at the second radio frequency coupled to the AC power distribution system via coupling transformer means which presents the high impedance to the AC power distribution system.

9. A carrier current system according to claim 7 comprising P.A. amplifier means in the transmitting means at the remote stations.

10. A carrier current system according to claim 7 comprising attenuation means between the receiving means and the AC power distribution system to protect the receiving means at the remote stations from large signals.

11. A carrier current system according to claim 1 in which the receiving means at the central station receives signals on a pair of different radio frequencies and the first capacitive tuning means is arranged to tune out the impedance of the first wire means at the center frequency of the pair, and the transmitting means at the central station transmits signals on a pair of different radio frequencies and the second capacitive tuning means is arranged to tune out the impedance of the second wire means at the center frequency of the pair.

12. A carrier current system according to claim 11 in which one of the pair of transmitted radio frequencies is associated with one of the pair of received radio signals in a command-response communication mode,
   the other of the pair of transmitted radio frequencies is used in half duplex intercommunication with the remote stations, and
   the other of the pair of received radio frequencies is used in asynchronous signalling from the remote stations.

* * * * *